United States Patent [19]
Colledge

[11] 3,791,290
[45] Feb. 12, 1974

[54] HIGH SPEED, HIGH TEMPERATURE EMBOSSING MACHINE AND WHEEL THEREFOR

[76] Inventor: Gary C. Colledge, 13900 Marquesas Way, Marina Del Rey, Calif. 90291

[22] Filed: Feb. 14, 1973

[21] Appl. No.: 332,298

Related U.S. Application Data

[62] Division of Ser. No. 216,061, Jan. 7, 1972, Pat. No. 3,730,081.

[52] U.S. Cl. .................................... 101/31, 101/25
[51] Int. Cl. .............................................. B41b 2/08
[58] Field of Search ....................... 101/8–11, 6, 21, 101/23, 25, 31; 219/244; 92/200

[56] References Cited
UNITED STATES PATENTS

| | | | |
|---|---|---|---|
| 3,269,304 | 8/1966 | Godfrey | 101/23 |
| 2,022,831 | 12/1935 | Smallen | 101/11 X |
| 1,331,790 | 2/1920 | Venge | 101/8 |
| 3,294,014 | 12/1966 | Kheisel | 101/8 |
| 3,097,592 | 7/1963 | Friedman | 101/6 |

*Primary Examiner*—Robert E. Pulfrey
*Assistant Examiner*—E. M. Coven
*Attorney, Agent, or Firm*—Warren, Rubin, Brucker & Chickering

[57] ABSTRACT

A high speed, high temperature embossing machine for embossing wood products and a high temperature embossing wheel therefor is disclosed. The embossing wheel is electrically heated by elements carried at the rim thereof to temperatures as high as 1,400° F., and an embossing feed rate as high as 200 feet per minute may be employed. A large diameter hollow wheel filled with a thermally insulating material and a tapered, elongated shaft are employed to minimize heat transfer to the shaft bearings for high speed operation. Embossing wheel tilting and embossing wheel raising and lowering mechanisms are also disclosed.

5 Claims, 2 Drawing Figures

PATENTED FEB 12 1974 3,791,290

HIGH SPEED, HIGH TEMPERATURE EMBOSSING MACHINE AND WHEEL THEREFOR

This is a division of application Ser. No. 216,061, filed Jan. 7, 1972, now U.S. Pat. No. 3,730,081.

BACKGROUND OF THE INVENTION

There is presently a substantial industry involved in the embossing of picture frame moldings, furniture and cabinet parts, doors, and a host of related articles. Previously, these products have been embossed virtually exclusively by heated embossing wheels in which an open flame is used to heat the embossing die. These machines typically run at a temperature of about 500°F. or less and at speeds of about 30 to 40 feet per minute or less. The embossing wheel is usually a small diameter wheel which is often not evenly heated by the gas flame, and the relatively low temperatures and small diameter of the wheel necessitate a relatively low embossing speed. Additionally, embossing machines which use an open flame inherently create a safety problem, particularly in light of the fact that such machines are used in wood working shops where sawdust and the like is often present. One example of an open flame embossing machine is disclosed in U.S. Pat. No. 2,703,463.

Another approach has been taken in connection with the embossing of wood and plastic products in an attempt to reduce the hazard created by the open flame embossing machines. Instead of using an open flame, the embossing dies may be heated externally by means of electrical resistance coils or a radiation source such as an infra-red lamp. Typical of these machines are the devices set forth in U.S. Pat. Nos. 3,294,014 and 3,393,294. In these devices, the surface temperature can be elevated to a relatively high temperature but they are still run at a relatively low speed of 40 feet per minute, or less, in all probability due to the rapid dissipation of the surface heat upon contacting the material to be embossed.

Finally, a limited effort has been made to incorporate an electrical heating element into an embossing wheel. In connection with the embossing of gold leaf, inherently a relatively low temperature process, U.S. Pat. No. 3,097,592 illustrates an embossing wheel having a heating element carried by a portion of the wheel for embossing gold leaf. U.S. Pat. No. 3,269,304 illustrates a small diameter embossing wheel primarily designed for leather and plastics which may optionally include an electrical heating element at the center thereof. This device, however, is also inherently a relatively low temperature,low speed embossing machine.

Accordingly, it is an object of the present invention to provide an embossing machine which is constructed in a manner which emables wooden and plastic impregnated wooden articles to be embossed at a greatly increased feed rate while maintaining uniform penetration of the embossing die into the article.

It is another object of the present invention to provide a high speed embossing machine having a greatly improved capability to vary the embossing temperature, feed rate, and depth of penetration in accordance with the nature of the article to be embossed and the embossing pattern.

It is another object of the present invention to provide an embossing wheel for use in a high speed embossing machine which allows the easy and convenient interchanging of embossing dies.

It is still a further object of the present invention to provide an embossing machine and a high temperature embossing wheel which have improved safety, are easy to construct, and are simple and economical to operate.

Other objects and features of advantage of the embossing machine of the present invention will become apparent upon consideration of the drawings and the following description of the preferred embodiment.

SUMMARY OF THE INVENTION

The embossing machine of the present invention is comprised briefly of a frame having a work supporting surface and a pair of embossing wheel mounting elements positioned on opposed sides of and extending above the surface. An elongated high strength shaft is rotatably mounted between the mounting elements, and the shaft has a variable mass gradiating from a maximum at the center thereof to a minimum adjacent mounting elements, preferably accomplished by continuously tapering the shaft from the embossing wheel to the mounting elements. An embossing wheel is mounted on the shaft for rotation therewith and includes a hollow body having load bearing side plate and an angular rim in which a heating element is mounted. Thermally insulating material is disposed in the hollow body. The embossing wheel has a radial height dimension from the shaft preferably substantially in excess of the radius of the shaft in order that heat transfer to the shaft and down the shaft to bearings in the mounting elements is reduced. The periphery of the embossing wheel is preferably formed as a frusto-conical surface for mounting and demounting of an embossing die having a mating inwardly facing frusto-conical surface thereon and juxtapositioning of the die over the electrical heating element carried by the wheel. Shaft and wheel tilting and shaft and wheel raising and lowering mechanisms are provided.

DESCRIPTION OF THE PREFERRED EMBODIMENT

Figure 1:
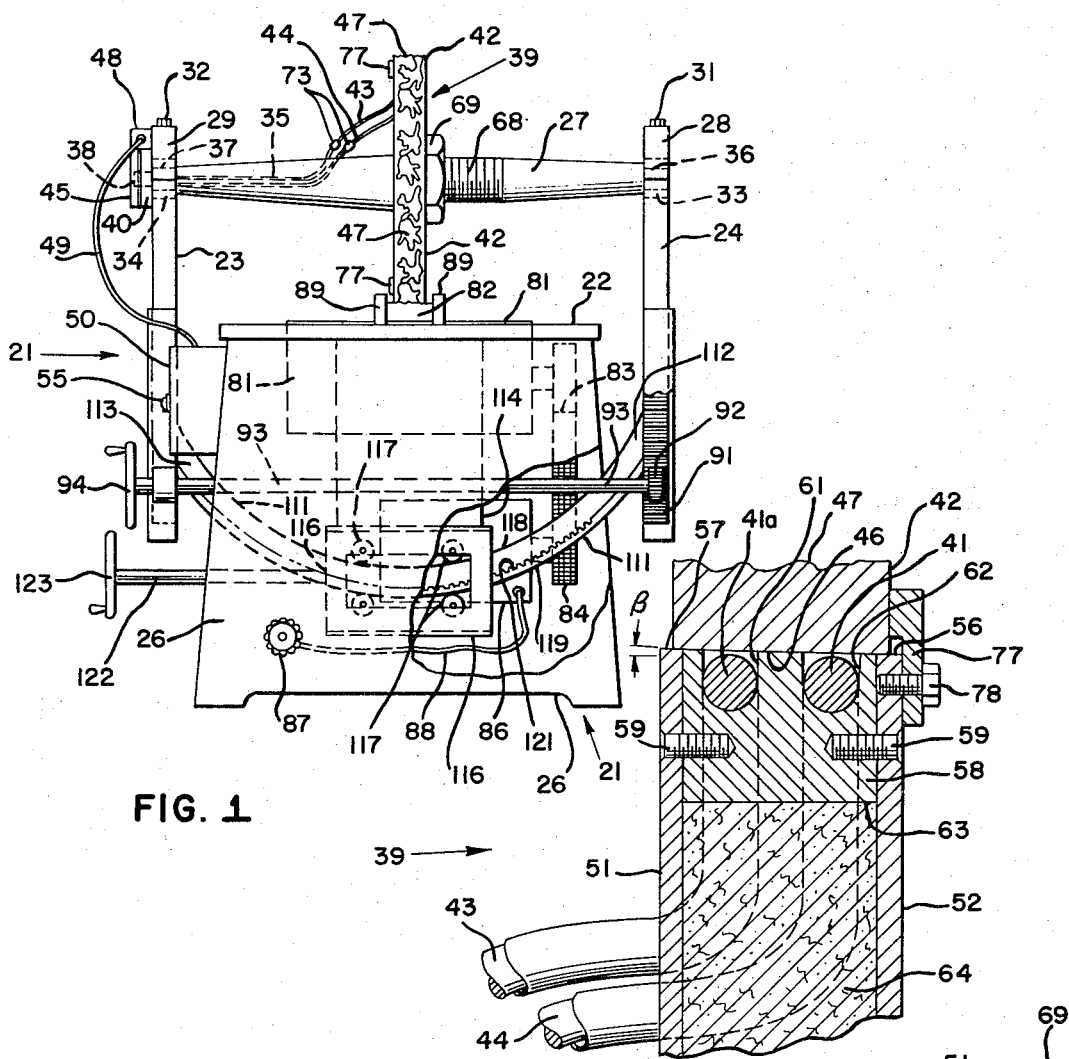
FIG. 1 is an end elevational view, partially broken away, of an embossing machine constructed in accordance with the present invention.

The embossing machine of the present invention includes a frame, generally designated 21, having a work supporting surface 22 and a pair of embossing wheel mounting elements 23 and 24 positioned on opposite sides and extending above surface 22. The frame further includes supporting leg structure 26 from which table 22 and the remaining apparatus of the machines are supported. Rotatably mounted between elements 23 and 24 is an elongated high strength shaft 27. Mounting elements 23 and 24 include removable upper portions 28 and 29 which are releasably fastened by fasteners 31 and 32 to the lower portions of the mounting elements. Positioned in mounting elements 23 and 24 are bearings 33 and 34 which cause ends 36 and 37 of shaft 27 to be journaled therein. As will be described more fully hereinafter, shaft 27 is provided with a further extension 38 beyond end 37 for transfer of electricity to the heated embossing wheel, generally designated 39.

It is a very important feature of the present invention that the embossing machine be constructed in a manner which enables the wheel 39 to be operated at very high temperatures, which in turn allows the machine to emboss articles at a high feed rate. In open flame heated embossing machines, the die temperature is typicallly 500°F, or less and the feed rate 25 to 35 feet per minute. Even in electrically surface heated devices, where the die temperature on the surface may momentarily reach over a thousand degrees, the feed rate of such machines is 40 feet per minute or less. In a high speed embossing machine in the present invention, the die temperature may be as high as 1,400°F. enabling feed rates as high as 200 feet per minute or five times that employed by prior art devices.

Figure 2:
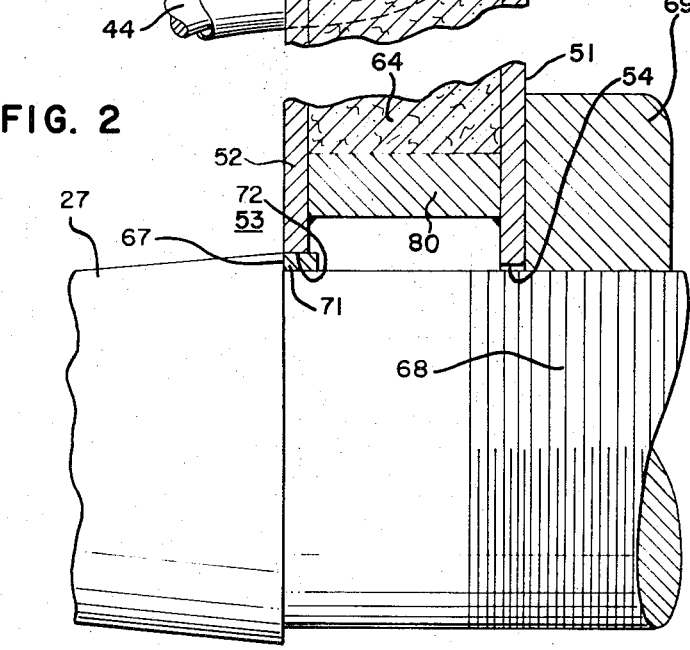
FIG. 2 is an enlarged, fragmentary end view, in cross-section, of an embossing wheel as shown in FIG. 1 and constructed in accordance with the present invention.

In order to maintain the embossing die at a high temperature at the embossing surface thereof and throughout the die for high speed continuous embossing, wheel 39, best seen in FIG. 2, is formed to carry an electrical heating element 41 (here shown as 2 winds 41 and 41a around the periphery of the embossing wheel) immediately adjacent to embossing die 42. Heating element 41 is connected by an electrical conductors 43 and 44 to a source of electricity. As will be seen, the immediate juxtapositioning of heating element 41 with back surface 46 of die 42 results in the die being uniformly heated so that not only the front embossing surface 47 of the die body reaches a high temperature, but the entire die is heated. Thus, pressing the die into the article to be embossed does not substantially diminish the temperature of surface 47 since the entire mass of the die is heated, rather than just the surface. Heating element 41 is preferably a resistance type of heating coil.

Heating die 47 to temperature in excess of 1,000° F. by means of heating coils carried by the embossing wheel in juxtaposition to the die, however, causes serious heat transfer problems within the embossing machine. In order to insulate the embossing machine, and more particularly, bearings 33 and 34, against the extreme heat to which die 42 is elevated, embossing wheel 39 is formed with a pair of relatively spaced apart, high strength, plate-like annular side portions 51 and 52 which act as the load carrying members for transfer of the embossing pressure from shaft 27 to die 42. Side portions 51 and 52 are preferably formed as annular plates having central openings 53 and 54 for mounting on shaft 27 and the peripheral edges 56 and 57 for receipt of die 42.

It is a feature of the present invention that the radial height of wheel 39 and side portions 51 and 52 from the central openings 53 and 54 be substantially in excess of the radial dimension of shaft 27 and central openings 53 and 54. An increase in the radial height from opening 53 to peripheral edge 56 has two benefits. First, the increase in radial distance at which heated die 42 and heating elements 41 are from shaft 27 result in a diminution of the amount of heat transferred to shaft 27. Additionally, an increase in diameter of the embossing wheel results in the embossing wheel contacting the object to be embossed for a longer period of time and at a more gradual angle than is experienced when small diameter embossing wheels are employed. The longer contact time further enables embossing to deeper depths and at higher rates of feed for a given temperature. Thus, the radial height of the wheel above shaft 27 is preferably at least about 1.5 times the diameter of the shaft at the wheel mount in order to reduce heat transfer to the shaft and increase contact time between the die and the object being embossed. Increasing the heat of the die and increasing its contact time with the object embossed in turn allows a substantial increase in the feed rate.

Side plates 51 and 52 are connected by annular rim portion 58 adjacent peripheral edges 56 and 57. Rim member 58 is preferably adjoined to annular side portions by fasteners 59 and is formed with a radially outwardly facing heating element receiving recess, in this case two recesses 61 and 62, extending circumferentially around the rim. The internal surface 63 of the rim and side plates 51 and 52 define an annular cavity which extends to a second inner annular member 80 adjacent shaft 27. Positioned in this cavity is a thermally insulating material 64 which substantially fills the cavity and has the effect of directing heat in rim 58 outwardly toward die 42 and insulating shaft 27 from transfer of heat thereto. Member 80 is welded in place after positioning of the insulating material in the cavity. Thus, heat must be transferred to shaft 27 down relatively thin die plates 51 and 52, both of which have a substantial surface area but a relatively thin cross-section (about ¼ inch thick for 12 inch diameter wheel). The heat generated by the heating element will be dissipated to some extent by radiation and conduction from moving surfaces 51 and 52 prior to being conducted down these relatively thin surfaces to shaft 27. In order to further reduce the transfer to shaft 27 and bearings 36 and 37, it is preferable that side plates 51 and 52 are constructed of a metal having relatively low thermal conductivity. One metal that is particularly well suited for this use is stainless steel since it has high strength at elevated temperatures and a relatively low thermal conductivity. The thermal conductivity of 304 and 316 alloy stainless steels at about 1,000° F. is between 10 and 15 Btu per hour per square foot per degree F per foot. This is about one half of the thermal conductivity of most steels or irons, which could be used, and about one fourth the thermal conductivity of brass and one tenth the thermal conductivity of most aluminums, which would not be satisfactory. It should be further noted that the insertion of thermally insulating materials such as ceramics has the disadvantage of either increasing the costs substantially or not being able to withstand the embossing pressures and impacts without cracking or fatiguing.

In order to further reduce the heat transfer to bearings 33 and 34, high strength shaft 27 preferably has a variable mass gradiating from a maximum mass adjacent the midpoint thereof to a minimum mass adjacent mounting elements 23 and 24. Such a gradiation in mass is conveniently accomplished by tapering a shaft 27 in two directions from adjacent the wheel mount to the bearings, as shown in FIG. 1. Since heat will tend to seek that portion of the shaft having the most mass, tapering the shaft from the wheel mount to the respective bearings further reduces heat transfer to the bearings. It should also be noted that in the event that excessive heat is transferred to bearings 33 and 34, the embossing machine must be run at a slower rate. Thus, tapering the shaft and insulating the shaft from heating element 41, as above described, allows the bearings to be cool and the embossing machine to be operated at a high feed rate.

Since mounting elements 23 and 24 span table 22, shaft 27 is also preferably formed from a steel to withstand the embossing pressures. Separation of mounting elements 23 and 24 facilitates embossing of wide articles and further reduces heat transfer to the bearings.

It is a feature of the present invention that the electrically heated embossing wheel may be easily removed from the shaft and replaced by another wheel. Thus, for some tasks an embossing wheel having a thickness of one inch may be employed while for others an embossing wheel having a thickness of 2 inches or 3 inches or more may be employed. Thicker embossing wheels generally require more winds on the heating element. As shown in the drawing, a single heating element 41 is wound twice around the periphery of the embossing wheel (the element must cross once if a single element is used), which is well suited for use in a one inch wide wheel. In order to remove this wheel, shaft 27 is formed with means for releasably mounting the wheel thereto, including shoulder 67, axially extending threaded portion 68, and nut element 69 threadably mounted on portion 68 for receipt of wheels of varying width between nut element 69 and shoulder 67. As best seen in FIG. 2, the shoulder and nut engage side walls of plates 51 and 52 to hold the wheel for rotation in a single plane. Additionally, shoulder 67 is preferably formed with a key means such as protrusion 71 which mates with a notch 72 in plate 52 of the wheel to cause the wheel to rotate with shaft 27.

In order to remove wheel 39 from the shaft conductors 43 and 44 must be disconnected from the machine at releasable sockets 73. The top portions 28 and 29 of the mounting elements 23 and 24 may be removed, and nut 69 unscrewed from threaded portion 68 to allow wheel 39 to be axially displaced down over the end 36 of shaft 27. A new wheel can be mounted on shaft 27 by reversing this procedure.

It is a further important feature of the present invention that the embossing die 42 may be rapidly and easily removed from the electrically heated embossing wheel. It is highly desirable to be able to use many different embossing patterns. Accordingly, and as best may be seen in FIG. 2, embossing die 42 has a radially inwardly facing surface 46 which is frusto-conical or a slightly tapered surface which mates with a frusto-conical radially outwardly facing surface on rim member 58. Additionally, side plate 52 carries locking means, here shown as a pivoted arm 77 secured by fastener 78 to the side plate. Die 42 can be axially urged onto the peripheral edges 56 and 57 and the outwardly facing surfaces of rim 58 and then locked in place by pivoting of arm 77 to the position shown in FIG. 2. As so locked in place, the inner surface 46 is juxtaposed over heating element 41 for efficient heat transfer to the embossing die. Several locking arms can be positioned circumferentially around wheel 39 in order to evenly hold the die on the periphery of the wheel. The frusto-conical mating surface insures that the die seats properly with the periphery of the wheel for maximum heat transfer from the rim and heating element. The taper of the frusto-conical surface 46 and mating surface on the rim is preferably less than about 15° so that the compressive forces during embossing do not generate too high an axial force against arm 77. It has been found that a taper of about 3°, as indicated by angle $\beta$, is best suited for the embossing wheel of the present invention. It should further be noted that with this amount of taper, the tendency to thrust the die axially under the radial load is virtually eliminated, and it should be noted that the die can be readily removed by briefly turning on the heating element, causing the die to expand and then tapping the die axially, after swinging arms 77 to a position aligning removal of the die. It is preferable that the die be tapered in a direction allowing its removal over end 36 of shaft 27 in a manner similar to the removal of the wheel from the shaft, and the top portion mounting elements 23 and 24 will have to be loosened, and in the case of element 28, removed, in order to allow the die to be removed from the wheel and the machine.

In the embossing machine of the present invention, shaft 27 is preferably not driven. Instead, a feed drum 81, which extends slightly above 22 to frictionally engage work piece 82, is provided. Drum 81 is driven through pulley 83 and chain or belt 84 by motor 86. Motor 86 is preferably a variable speed motor electrically connected to control knob 87 by conductor 88. Thus, the speed of the feed drum can be varied from abut 20 to about 200 feet per minute, depending upon the material being embossed and the temperature of die 42. Also mounted on table 22 are guide fences 89 which are laterally adjustable to accommodate various sizes of work pieces in the same fashion as guide fences on table saws and the like. The interference fit of work piece 82 between feed drum 81 and wheel 39 results in rotation of the embossing wheel and progressive embossing of the work piece as the feed drum advances the work piece.

It is a further feature of the present invention to provide an embossing machine in which the embossing wheel may be tilted for embossing on surfaces which are at an angle to table 22, and raised and lowered to accommodate work pieces which are of varying width. Raising and lowering of the embossing wheel is accomplished by means of a rack 91 and pinion gear 92 forming part of both mounting elements 23 and 24. These rack and pinion gears are interconnected by shaft 93 and simultaneously adjusted by hand wheel 94 for accurate vertical displacement of the wheel with respect to the work piece.

In order to allow tilting of the embossing wheel of the present invention, mounting elements 23 and 24 are secured to an arcuate track or cradle 111 at ends 112 and 113 thereof. Member 114 is fixedly secured to the frame and leg supporting 26, and it carries at is lower most end a guide means 116 carrying rolling element 117, which engages upper and lower surfaces 118 and 119 of track 111 for support of the track and mounting elements with respect to the leg supporting structure 26. Guide means 116 may be formed as a generally rectangular tubular member which surrounds track or cradle 111, and the rolling elements 117 are preferably rollers which engage the upper and lower surfaces of the track over a width of several inches to prevent angular tipping of the mounting elements about the longitudinal access of track 111.

In order to allow adjustment of the angle of tilt, adjusting means, including a worm gear (not shown) and a rack 121 on track 111, are provided, and the cradle 111 is advanced by means of shaft 122 and hand wheel 123. Thus, upon rotation of hand wheel 123, the work gear engages rack 121 on cradle 111 causing the cradle to be displaced laterally with the arcuate upper and lower surfaces 118 and 119 of the track moving with respect to rollers 117, fixed to the frame. The result is a tipping of mounting elements 23 and 24 and angular displacement of the shaft and embossing wheel with respect to the article being embossed and table 22. It is preferred that the arcuate track have a center of curvature following substantially on a plane passing through the center of the wheel and parallel to side plates 51 and 52. Still further, it is preferable that the center of curvature be at about the working surface of the table in order that the embossing die will remain at about the center of the table during the tilting of the embossing wheel.

Electricity is supplied to the heating element in wheel 39 from control panel 50 through conductor 49 to brush assembly unit 48 and dual tracks 45 and 40, which are in turn connected to electrical conductors 43 and 44 passing through passageway 35 in shaft 27 to extension 38 thereof. Control panel 50 is provided with a knob 55 allowing manual adjustment of the heat by means of a rheostat positioned in the control box 50.

Although considerable variation is possible in constructing the embossing machine as the present invention, some typical specifications would include a shaft 27 or spindle which is about 30 inches long and tapers from about 3 inches at flange 67 to about 2 inches at the shaft mounts. The embossing wheel may be 12 inches in diameter and may accommodate dies varying from ¼ inch to 2 inches wide or wider. Motor 86 may be a two horsepower motor to drive a 10 ½inch diameter feed drum 81. The power supply to the embossing wheel may be 220 to 240 volts A.C. (single phase), with a 15 amp current if 1 inch wheels are used and a 30 amp current for 2 inch wheels having two heater elements in them. A Warner Electric Brake & Clutch Co. brush holder, Model 819-0032, may be used as brush holder 48. Bearings are preferably of the sealed type and need lubricating only at long intervals. It is possible with an embossing machine constructed as above outlined with the temperature on the order of about 1,200°F. to emboss patterns at a rate of as much as 200 feet per minute to a depth of ¼ inch in wood. Additionally, the high strength construction and high temperature embossing wheel allows the machine to be used to emboss plastic impregnated woods. Thus, the variable feed rate and variable heated embossing wheel accommodate the use of the embossing machine on a wide variety of materials at a maximum rate of feed.

I claim:

1. An electrically heated high temperature embossing wheel for use in a high speed embossing machine comprising:
    a. a wheel body including:
        i. a pair of relatively spaced apart, high strength, plate-like annular side portions each being formed with a central opening dimensioned for mounting on a shaft on said embossing machine for rotation therewith, said side portions each further being formed with a peripheral edge having a radial height dimension from said central opening to said peripheral edge substantially in excess of the radial dimension of said central opening; and
        ii. an annular rim portion connecting said side portions adjacent the peripheral edges thereof and defining with said side portions a cavity extending radially from said rim portion to the central openings of said side portions, said rim portion being formed with a radially outwardly facing heating element receiving recess extending circumferentially around said rim portion;
    b. thermally insulating material disposed in and substantially filling said cavity; and
    c. an electrical heating element mounted in said recess and having electrical conductors extending therefrom for connection to a source of electricity.

2. An electrically heated embossing wheel as defined in claim 1 wherein,
    said radial height dimension is at least 1.5 times the radial dimension of said central opening.

3. An electrically heated embossing wheel as defined in claim 2 wherein,
    said peripheral edges and a radially outwardly facing surface of said rim portion are formed and positioned to lie substantially on and define a frusto-conical surface at the periphery of said wheel whereby an annular embossing die having a frusto-conical radially inwardly facing surface may be mounted in juxtaposed relation to said heating element by axially urging said die onto the periphery of said wheel, and
    mean secured to said body for selectively locking said embossing die in juxtaposed relation to said heating element and releasing said embossing die for removal from said wheel.

4. An electrically heated embossing wheel as defined in claim 3 wherein,
    said side portions are formed as metallic plates of relatively thin cross-section as compared to the radial height thereof and relatively low thermal conductivity for a metal, and wherein,
    said rim portion is a member fastened to said plates adjacent said peripheral edges and said recess is formed as two side-by-side channels for receipt of two winds of said heating element, and
    an annular embossing die, having a radially outwardly facing surface with an embossing pattern thereon and a frusto-conical radially inwardly facing surface dimensioned for sliding mating with the periphery of said wheel mounted on said wheel with said inwardly facing surface juxtaposed over said heating element.

5. An electrically heated embossing wheel as defined in claim 4 wherein,
    said plates are formed of stainless steel, and wherein,
    said outwardly facing surface and said peripheral edges define a frusto-conical surface having a taper less than about 15°.

* * * * *